United States Patent

[11] 3,608,917

| | | |
|---|---|---|
| [72] | Inventor | Joseph A. Cogliano<br>1268 Maple Ave., Baltimore, Md. 21227 |
| [21] | Appl. No. | 850,187 |
| [22] | Filed | Aug. 14, 1969 |
| [45] | Patented | Sept. 28, 1971 |

[54] COLLAPSIBLE BICYCLE
13 Claims, 17 Drawing Figs.

[52] U.S. Cl. .................................................. 280/7.16,
280/209, 280/231, 280/278
[51] Int. Cl. ......................................................... B62k 13/00
[50] Field of Search .......................................... 280/7.16,
231, 278, 209, 7.15, 287

[56] References Cited
UNITED STATES PATENTS

| | | | |
|---|---|---|---|
| 569,705 | 10/1896 | Brennan ...................... | 280/7.16 |
| 582,678 | 5/1897 | Pates ............................ | 280/7.16 |
| 584,316 | 6/1897 | Baum et al. .................. | 280/7.16 |
| 1,522,039 | 1/1925 | Swearinger .................. | 280/209 |

*Primary Examiner*—Kenneth H. Betts
*Attorney*—Virgil H. Marsh

ABSTRACT: A collapsible bicycle is disclosed which can be made into or converted into various tandem or coupled arrangements. The basic collapsible bicycle contains a front steering and wheel unit, a central seat and pedaling unit and a rear wheel unit.

INVENTOR
JOSEPH A. COGLIANO

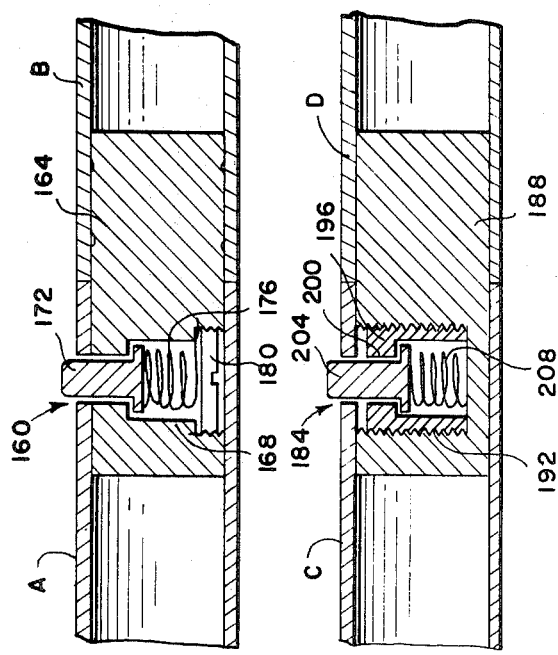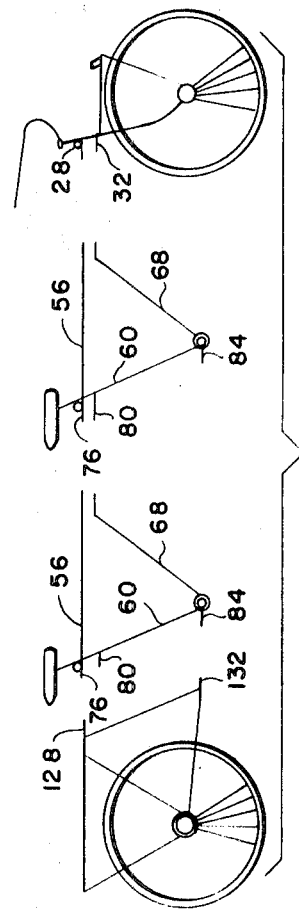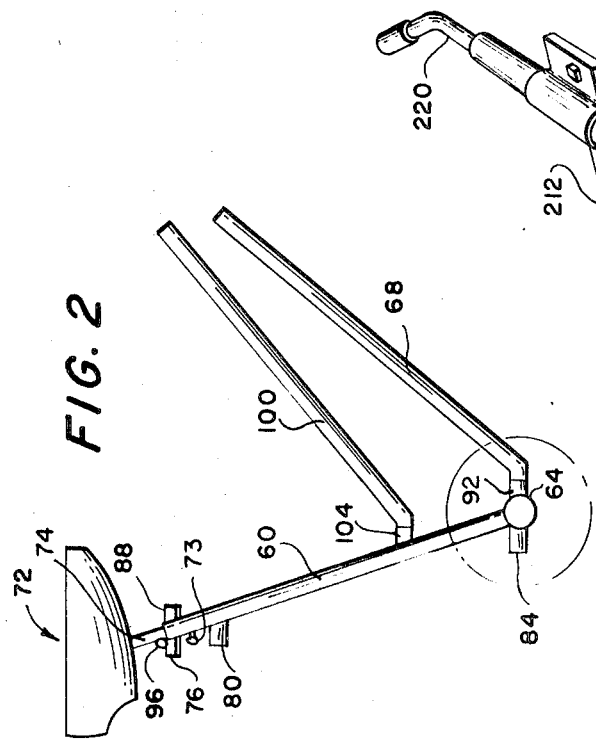

INVENTOR
JOSEPH A. COGLIANO

BY Virgil H. Marsh
ATTORNEY

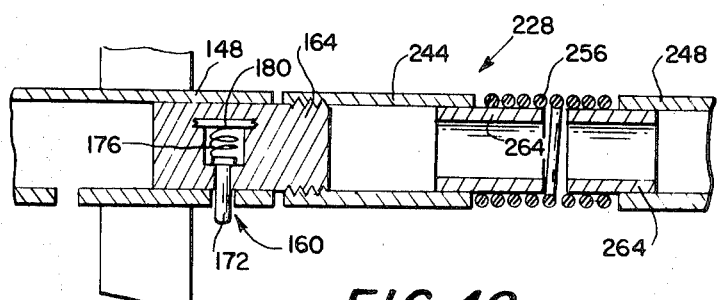
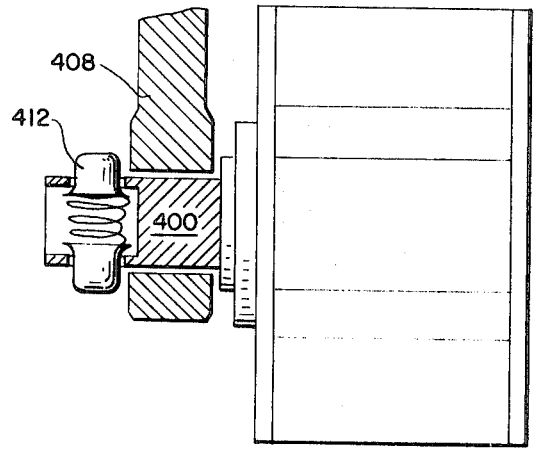
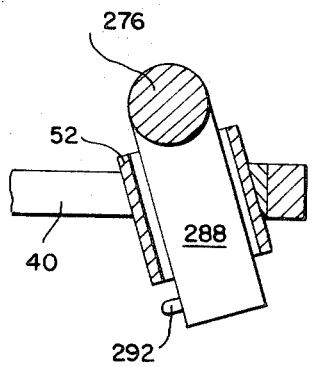
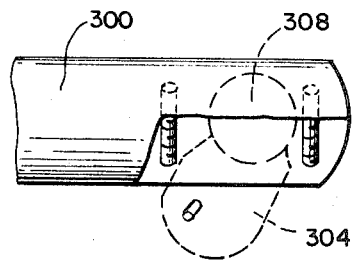
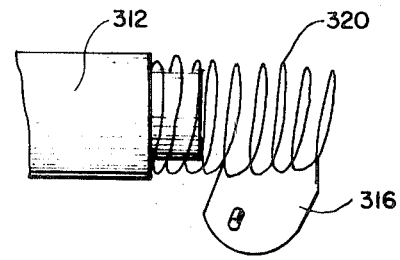

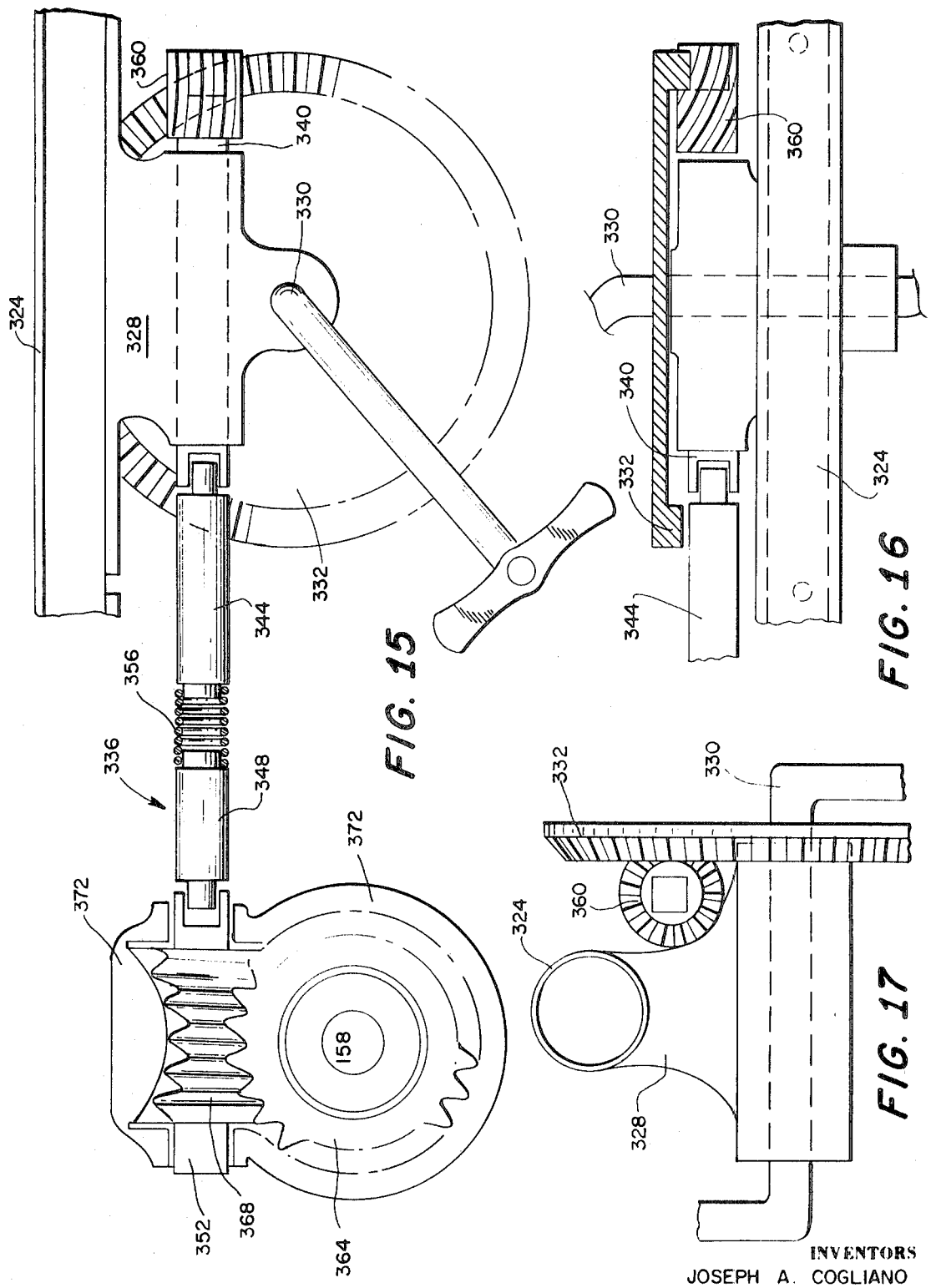

COLLAPSIBLE BICYCLE

BROAD DESCRIPTION OF THE INVENTION

This invention involves a velocipede which can readily be assembled or disassembled, which can readily be converted into bicycles "built-for-two," etc., and which can readily be placed in a side-by-side configuration. The basic collapsible bicycle is comprised of three units: a front steering and wheel unit; a central seat and pedaling unit; and a rear wheel unit. These units are illustrated in FIG. 1. Each unit is constructed so that it has a series of essentially parallel attachment bars that detachably mate with similar attachment bars on the other units. The central unit is constructed so that it can be placed in the velocipede as a repetitive unit. Each bicycle (its separate units) contains attachment points which allow special attaching rods to be connected so that two bicycles can be placed side by side. The novel points of this invention are shown and explained in detail in the following paragraphs.

Several of the advantages of the present bicycle are that it is collapsible; can be used as a bicycle seating one person or can be modified to seat two, three or more persons, as desired; can be used abreast with one or more similar bicycles; etc. A carrier (seat or container) can be used between two of the bicycles when they are situated abreast. The bicycle can be assembled or disassembled without the use of any tools.

DETAILED DESCRIPTION OF THE INVENTION

The accompanying drawings illustrate several embodiments of this invention. In such drawings:

FIG. 2 is a side view of segment B of FIG. 1 showing a woman's or girl's version of the bicycle of this invention;

FIG. 3 is a sectional view of one of the types of attaching means;

FIG. 4 is a sectional view of one of the types of attaching means;

FIG. 5 is a perspective view of a type of handlebar arrangement that can be used with the bicycle of this invention;

FIG. 6 is a side view similar to FIG. 1 except that two segment B's have been incorporated in tandem to form the velocipede;

FIG. 10 is a sectional view of the major portion of the connecting bars for coupling segments C's, B's and inner A's;

FIG. 11 is a sectional view of the swivel joint for the connecting bars for coupling segments A's as shown in FIG. 7;

FIG. 12 is a sectional view of another type of connecting bar which can be used in the swivel joint of FIG. 11 and, when placed in a straight line, in the swivel joint of FIG. 10;

FIG. 13 is a sectional view of another type of connecting bar which can be used like the connecting bar of FIG. 12;

FIG. 14 is a sectional view of a removable type of pedal that can be used with the velocipedes of this invention;

FIG. 15 is a side view of a special gearing arrangement that can be used in place of the normal chain propulsion means;

FIG. 16 is a top view of a portion of FIG. 15; and

FIG. 17 is a back view of a portion of FIG. 15.

Figure 1:
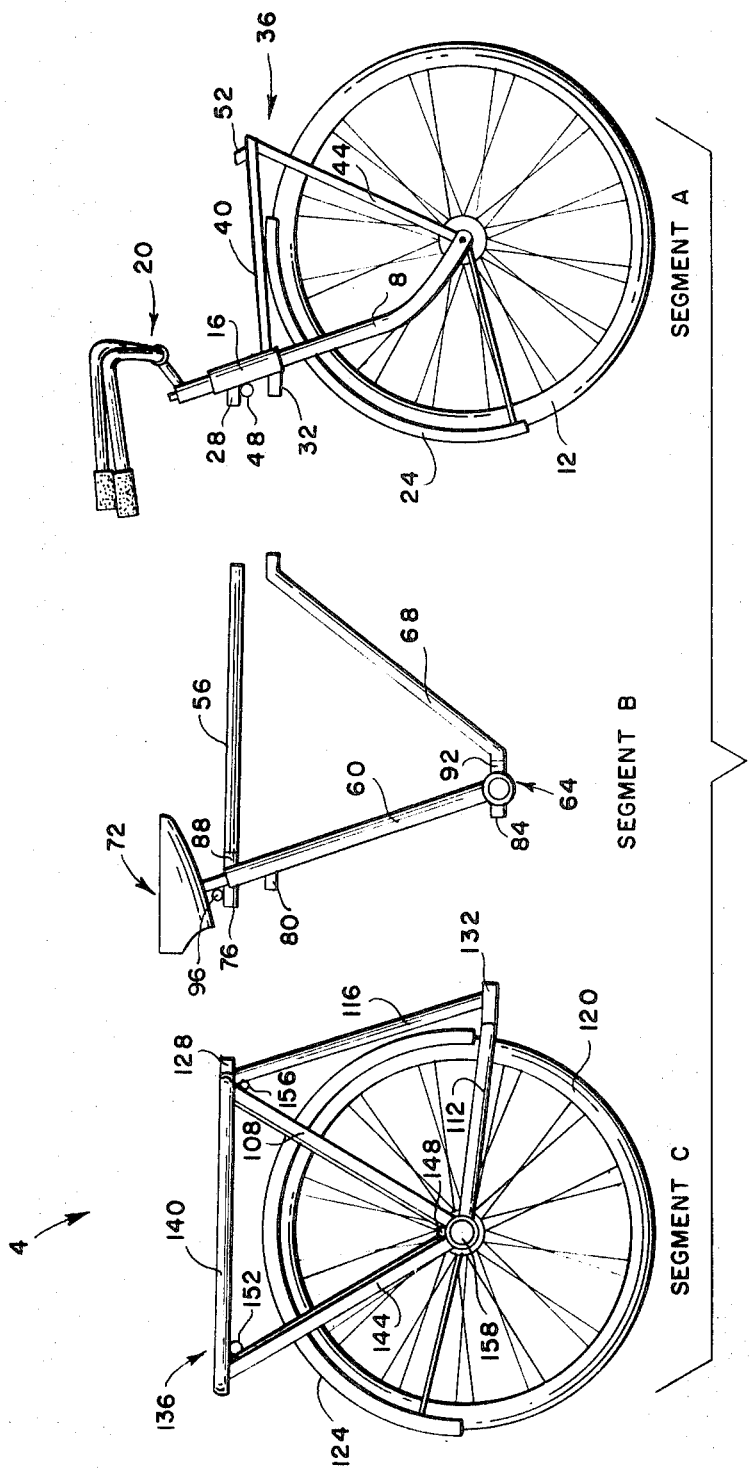
FIG. 1 is a side view of the man's or boy's version of the bicycle of this invention, with the three major segments separated and with the pedals, gears, chain, etc., not shown.

A novel collapsible bicycle (velocipede) 4 is shown in FIG. 1. Bicycle 4 is made up of segments A, B and C. Segment A includes front fork 8, front wheel 12, which is rotatably mounted on fork 8; head tube 16, in which front fork 8 is pivotally mounted; handlebar assembly 20, which is attached to front fork 8; and fender 24. Parallel tubes 28 and 32 are mounted on head tube 16. Tubes 28 and 32 do not have to be horizontal with the ground but it is essential that they be essentially parallel with themselves. Tubes 28 and 32 can be any shape, but are preferably circular in cross section. Segment A must include carrier 36 which is comprised of bars 40 and struts 44. Bars 40 can be replaced by any conventional carrier means such as a platform. Carrier 36 is a very important, mandatory part. Attachment tube 48 is mounted horizontally at the lower corner of the intersection of head tube 16 and tube (attachment bar) 28. Attachment tube 52 is mounted at the end of bars 40, but can be mounted near the ends. Attachment tube 52 is mounted in a somewhat vertical manner, and preferably parallel to 16.

Segment B includes a frame. In FIG. 1 that frame is top bar 56, saddle pillar 60, housing 64 and bottom bar 68. Seat 72 is mounted on saddle pillar 60. As shown in FIG. 1, the front ends of bars 56 and 68 are essentially parallel, and are spaced and slanted to mate with tubes 28 and 32. Those ends of bars 56 and 68 can be detachably mounted to the ends of tubes 28 and 32 in any convenient manner, but preferred means are illustrated in FIGS. 3 and 4. Tubes 76 and 80 are mounted on saddle pillar 60, and tube 84 is mounted on housing 64 (but can readily be mounted on saddle pillar 60). Tubes 76, 80 and 84 must be essentially parallel, and tubes 76 and 80 must be spaced the same distance that tubes 28 and 32 are spaced. Bar 56 can be permanently attached to saddle pillar 60 but the detachable arrangement shown is preferred. Bar 56 is detachably mounted to tube 88 by any convenient means, but preferred means are illustrated in FIGS. 3 and 4. Bar 68 can be permanently attached to housing 64 (or saddle pillar 60) but the detachable arrangement is preferred. Bar 68 can be detachably mounted to tube 92 by any convenient means, but preferred means are illustrated in FIGS. 3 and 4. Attachment tube 96 is mounted at the upper edge of the intersection of tube 76 and saddle pillar 60 in a horizontal manner, or nearby. A support bar can be mounted between top bar 56 and bottom bar 68 on the front ends to lend support and stability (the bar is not shown).

Segment B can be modified to a girl's bicycle, as shown in FIG. 2, by using top bar 100, which is slanted so that it attaches to saddle pillar 60 at a point near its bottom portion. Bar 100 can be detachably mounted to tube 104 by any convenient means, but preferred means are illustrated in FIGS. 3 and 4.

Segment C includes top back fork 108; bottom back fork 112; support bar 116, which is attached between forks 108 and 112; back wheel 120; and fender 124. Parallel tubes 128 and 132 are mounted on support bar 116 or near the ends thereof. Tubes 128 and 132 are essentially parallel with themselves, and are spaced and slanted to mate with tubes 76 and 84. Those ends of tubes 128 and 132 can be detachably mounted to the ends of tubes 76 and 84 in any convenient manner, but preferred means are illustrated in FIGS. 3 and 4. Segment C can include carrier 136 which is comprised of bars 140 and struts 144. Carrier 136 is optional, but is preferred. Attachment tube 148 is mounted at the lower end of fork 108 (usually one tube 148 on each side) in a horizontal manner. When carrier 136 is used, attachment tube 152 can be mounted at the inside of the intersection of bars 140 and struts 144 in a horizontal manner. Attachment tube 152 can also be mounted near that intersection. Attachment tube 156 is mounted at the intersection of top back fork 108 and support bar 116, or nearby. Attachment tube 156 is mounted in a horizontal manner.

If a small wheel is used in segment C, then struts 144, top back fork 108 and support bar 116 may be shortened, and tube 128 can be detachably mounted in the end of tube 80.

Seat 72 can be slidably mounted in saddle pillar 60 as shown in FIG. 2, wherein 73 is a spring-loaded pin which mates with holes in shaft 74 of seat 72 and which holds seat 72 in the desired position.

Conventional pedaling means have not been shown in FIG. 1 so as not to obscure important parts of the invention. Such conventional pedaling means utilize housing (tubular) 64 and housing 158 (adjustable if desired) to mount conventional sprockets, gears, chains, peddle arms, etc. For purposes of supplying that conventional information, the disclosure of U.S. Pat. No. 2,372,024 is incorporated herein by reference. Any chain should be constructed so that it can readily be disassembled for mounting or taking off.

FIG. 3 and FIG. 4 illustrate detachable means of joining any of two tubes and/or bars mentioned in the preceding paragraphs describing the figures. In FIG. 3, tube A contains hole 160 and tube B contains permanently attached block 164. Multichambered passageway 168 in block 164 contains pin 172, spring 176 and screw plate 180. Spring 176 holds pin 172 in the extended position in hole 160 until external pressure causes it to recede (as in withdrawal). In FIG. 4, tube C contains hole 184 and tube D contains permanently attached block 188. Passageway 192 (entirely threaded) contains threaded block 196. Block 196 contains dual-chambered passageway 200, which in turn contains pin 204 and spring 208. Spring 208 holds pin 204 in the extended position in hole 184.

FIG. 5 shows an embodiment of handlebar assembly 20 where arm 212 is attached to the top portion of front fork 8. Bar 216 is mounted in the adjustable portion of arm 212, as shown. Handlebars 220 are detachably affixed to each end of bar 216 in a manner similar to that shown in FIG. 3.

FIG. 6 illustrates the so-called tandem bicycle arrangement of this invention wherein a bicycle is made up by sequentially attaching a segment A, a first segment B, a second segment B and a segment C. Another set of handlebars can be mounted behind the seat of either, or both of, the first or the second segment B if desired. Any conventional dual pedaling means can be used to link both segments B to the rear tire of segment C. For purposes of supplying that conventional information, the disclosure of U.S. Pat. No. 582,678 is incorporated herein by reference.

Figure 8:
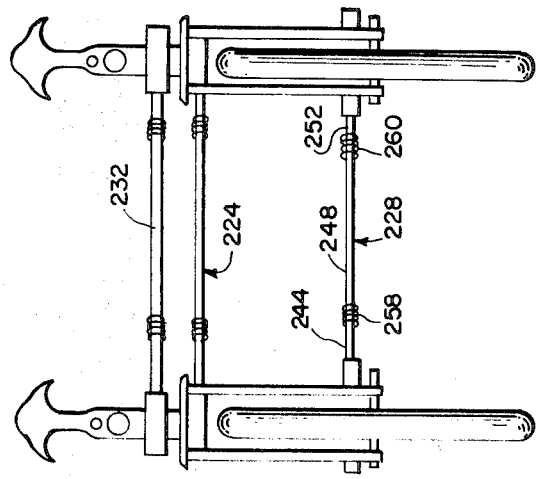
FIG. 8 is a back view of the velocipede shown in FIG. 7.
Figure 7:
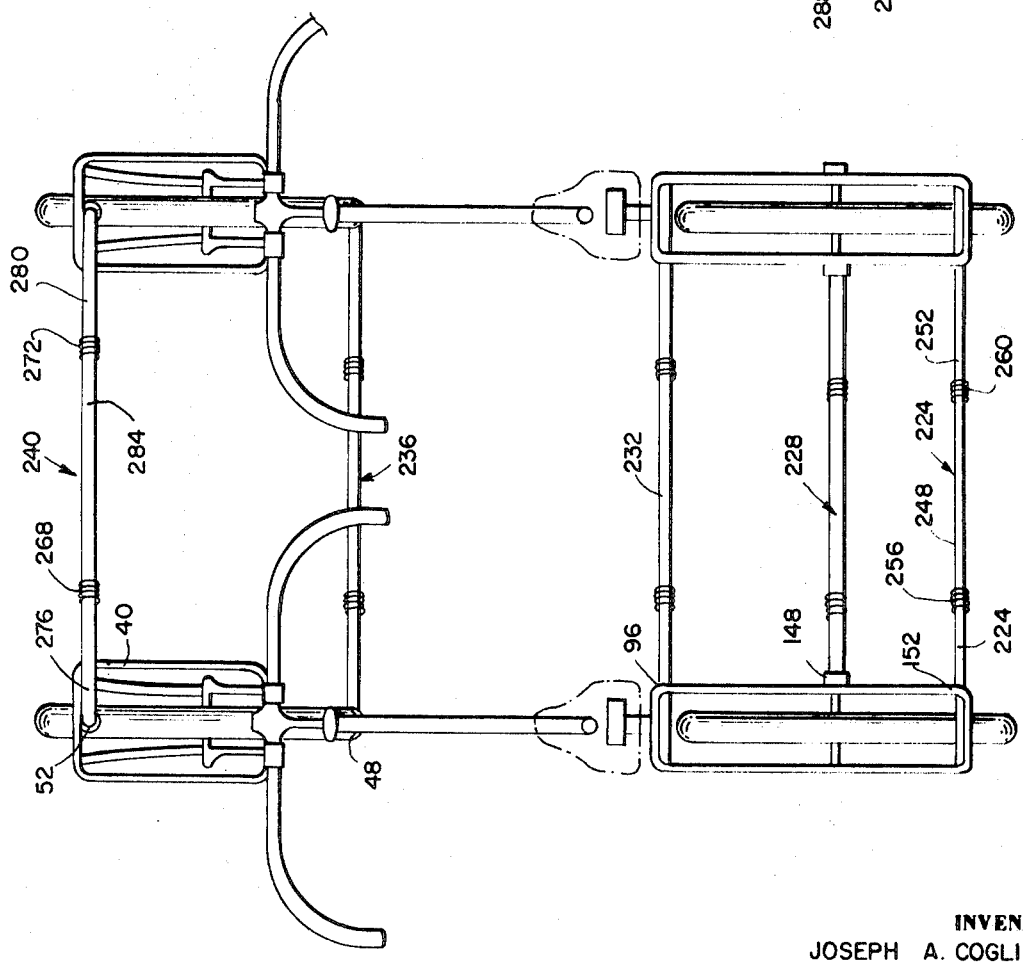
FIG. 7 is a top view of two of the bicycles of FIG. 1 coupled together in a side-by-side manner.

FIG. 7 is a top view of two of the bicycles of FIG. 1 in a tandem arrangement. Crossbars 224, 228, 232, 236, and 240 hold both bicycles in tandem alignment during movement and at rest. FIG. 8 is a back view of the same tandem arrangement as found in FIG. 7. Crossbars 224, 232 and 236 each include three solid members (e.g., 244, 248 and 252) and two springs (e.g., 256 and 260) jointing the three solid members. The ends are attached to attachment tubes 152, 148, 96 and 48. FIG. 10 illustrates the attaching of crossbar 228 to attachment tube 148 by means identical to that shown in FIG. 3. FIG. 10 also better illustrates the relationship of spring 256 to solid members 244 and 248. Tubular plates 264 are preferably affixed to members 244 and 248. The ends of spring 256 are affixed to solid members 244 and 248. Center portion 248 can be telescoped in construction. When one bicycle moves in relation to the other bicycle, the spring allows the relative movement (vertical and/or horizontal) while keeping the pair of bicycles stabilized. When the strain is removed, the spring draws the two bars back into their normal relative positions. The two connected bicycles tend to move relative to each other when riding over ruts, bumps, etc., or when turning curves. Crossbar 228 is like bar 224, but shorter.

Figure 9:
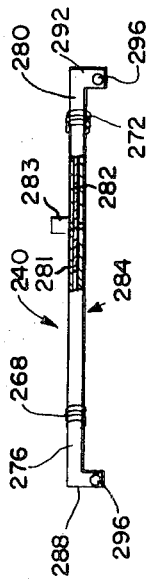
FIG. 9 is an alternative method of coupling the two bicycles shown in FIG. 7.

FIG. 9 illustrates crossbar 240, which is telescopic in construction. Crossbar 240 contains two springs (e.g., 268 and 272) and three solid members (e.g., 276, 280 and 284), joined together by the springs. Tubes 52 serve as mounting holes for tips 288 and 292 of solid members 276 and 280, respectively, and allow these tips to rotate whenever the bicycles are turned. Depressible buttons 296 in tips 288 and 292 are optional, but help in keeping crossbar 236 in place. This is best illustrated in FIG. 11. While 284 is termed a solid member, it is shown as a telescopic member in FIG. 9. Member 284 includes member 281 and member 282, which fits within member 281 in a slidable manner. Spring-loaded pin 283 fits into a series of holes in member 282 and holds both members in the desired positional relationship. FIG. 12 shows an alternative end fitting that can be used with the joined bicycles. Solid bar 300 corresponds to solid bars 276 and 280 in crossbar 240. End piece 304, which fits in tubes 52, is affixed to solid bar 300 by means of enclosed swivel head 308. FIG. 13 shows a further end fitting that can be used with the joined bicycles. Solid bar 312 corresponds to solid bars 276 and 280 in crossbar 240. Endpiece 316, which fits in tubes 52, is affixed to solid bar 312 by means of spring 320.

The pedal used in the pedaling means mentioned above (used for propulsion) can be the one shown in FIG. 14 where shaft 400 of pedal 404 is rotatably mounted in the end of shank 408. Pedal 404 is held in place by means of spring-mounted pins 412 located in the end of shaft 400. Pedal 404 can be removed or reversed during storage or transportation.

The chain method of propulsion mentioned in the discussion of FIG. 1 can be modified as shown in FIG. 15. (Of course, the gearing and drive shaft arrangement shown in FIG. 15 can be constructed so that it fits into the frame shown in FIG. 1 without having to modify tubular housings 64 and 158.) Tube 84 and tube 92 are united into one tube (324). Mounting 328 is attached to tube 324. Pedal shaft 330 is rotatably mounted in mounting 328, and gear 332 is mounted in mounting 328. Drive shaft 336 includes shaft units 340, 344, 348 and 352 and spring 356. Shaft unit 340 is rotatably mounted in mounting 328. Worm gear 360 is mounted on the end of shaft unit 340 and rotatably engages gear 332. FIGS. 16 and 17 show this arrangement. Gear 364 is attached to shaft 156. Gear 364 engages worm gear 368, which is mounted on shaft unit 352. Shaft unit 352 is rotatably mounted in gear cover 372, which is attached to forks 108 and 112. When the bicycle is used in tandem (two or more segments B), the gear units for each can be linked together by means of the mating holes and nipples found on the opposite ends of each shaft unit (e.g., 340).

All of the detachable mountings, etc., can be achieved in the manner described or can be achieved in other manners, such as screw means. The important point is that they can readily be assembled and disassembled without the use of tools.

To illustrate that several areas of this invention can be varied within the means of the artisan, tubular plates 264 (in the crossbars) can be eliminated and springs 256 can be attached (e.g., welded) to the solid members (e.g., 244). Further, when the attachment tubes are located in the centerline of each bicycle, better tilting control is achieved. Even the end fittings of FIGS. 12 and 13 can then be used if attachment tubes are rotated 90° so as to be in the plane of the bicycle.

Examples of combinations that can be obtained with the three basic bicycle segments of this invention are illustrated as follows:

| | | |
|---|---|---|
| 1. | A—B—C | Normal bicycle arrangement. |
| 2. | A—B—B—C | Tandem bicycle arrangement. |
| 3. | A—B—C<br>\|  \|  \|<br>A—B—C | Coupled bicycle arrangement. |
| 4. | A—B—C<br>         \|<br>         C | Three-wheel bicycle arrangement. |
| 5. | A—B—B—C<br>            \|<br>            C | Three wheel, tandem bicycle arrangement. |
| 6. | A—B—B—C<br>\|  \|  \|  \|<br>A—B—B—C | Coupled, tandem bicycle arrangement. |
| 7. | A—B—B—B—C | Tandem bicycle arrangement (three B segments). | where A, B and C correspond to segments A, B and C of the bicycle shown in FIG. 1. It is seen that other arrangements of the velocipede can be obtained.

It should be noted that the springs in the crossbars should be located so that each corresponding set of springs is located in an imaginary plane that is perpendicular to the ground.

The bicycle of this invention can contain only one bar between head tube 16 and saddle pillar 60, or more than the two bars shown in FIG. 1.

What is claimed:

1. The collapsible bicycle which comprises:
   1. a front unit which includes:

a. a front fork;
b. wheel means rotatably attached to the lower ends of said front fork;
c. steering means attached to the upper portion of said front fork;
d. a head tube rotatably attached to the middle portion of said front fork which allows said front fork to be pivoted while said pivoting means remains stationary;
e. an upper attachment bar and a lower attachment bar, each of which are essentially parallel with each other and each of which are connected on one end to said head tube; and
f. a carrier;

2. a center unit which includes:
g. pillar means;
h. a seat attached to the upper portion of said pillar means;
i. a first bar attached to the lower portion of said pillar means, the other end of said first bar detachably mating with said lower attachment bar (e) and said other end of said first bar being on the same axis as said lower attachment bar (e);
j. a second bar attached to said pillar means at a point above the attachment point of said first bar, the other end of said second bar detachably mating with said upper attachment bar (e) and said other end of said second bar being on the same axis as said upper attachment bar (e);
k. a lower attachment bar and an upper attachment bar, each of which is essentially parallel with each other, each of which is connected on one end to the upper portion of said pillar means, each of which is essentially parallel to said upper attachment means (e), and each of which is located diametrically on said pillar means from said first bar (i); and
l. an attachment bar located on the lower end of said pillar means (g), which is essentially parallel with attachment bars (k) and which is in the same plane as attachment bars (k);

3. a back unit which includes:
m. pillar means;
n. a first fork, the head of which is attached to the lower portion of said pillar means (1) and which is generally situated in a horizontal manner;
o. a second fork, the head of which is attached to the upper portion of said pillar means (m) and which is situated so that the ends of the legs thereof are connected to the ends of said first fork (n);
p. wheel means rotatably attached to forks (n) and (o) at the intersection of the ends of the legs thereof;
q. a first attachment bar attached to said upper portion of said pillar means (m), the other end of said first attachment bar (q) detachably mating with said upper attachment bar (k) and said other end of said first attachment bar (g) being on the same axis as said upper attachment bar (k); and
r. a second attachment bar attached to the lower portion of said pillar means (m), the other end of said second attachment bar (r) detachably mating with said attachment bar (1) and said other end of said second attachment bar (r) being on the same axis as said attachment bar (r); and 4. propulsion means which is rotatably mounted on said lower end of pillar means (g), which is attached to said wheel means (p) in such a manner that said wheel means (p) rotates when said propulsion means rotates.

2. The collapsible bicycle of claim 1 wherein a second central unit (2) has been attached to the front of said first central unit (2) and to the rear of said front unit (1).

3. The collapsible bicycle of claim 1 wherein additional propulsion means has been rotatably mounted on said second central unit (2) and has been rotatably connected to said propulsion means (4).

4. The collapsible bicycle of claim 1 wherein attachment tubes are horizontally mounted thereon, one mounted on said head tube (d), one mounted at or near the intersection of said pillar means (g) and said upper attachment bar (k), one mounted at or near the intersection of said pillar means (m) and said second fork (o), and one mounted at or near the intersection of said first fork (n) and said second fork (o), and an attachment tube which is mounted in a somewhat vertical manner at or near the front portion of carrier (f).

5. The collapsible bicycle of claim 4 which contains a second carrier attached to said back unit and an attachment tube which is horizontally mounted at or near the rear portion of said second carrier.

6. The collapsible bicycle of claim 1 wherein the handlebars of said steering means are detachably affixed to said remainder of said steering means.

7. The collapsible bicycle of claim 1 wherein said first and second bars of said center unit comprises two portions, one of which is comparatively short and which is attached to said pillar means (g).

8. The collapsible bicycle of claim 1 wherein said seat is slidably attached to pillar means (g).

9. The collapsible bicycle of claim 1 wherein said propulsion means comprises gear means rotatably mounted on said center unit at the intersection of pillar means (g) and said first bar (i), gear means rotatably mounted on said back unit at the intersection of said first fork (n) and said second fork (o), and a rotatable shaft linking said two gear means by means of gears located on each end of said shaft and which engage said gear means.

10. The collapsible velocipede which comprises two of the collapsible bicycles of claim 4 interconnected by crossbars mounted in said horizontally mounted attachment tubes and interconnected by a crossbar pivotally mounted in said attachment tubes which are mounted in a somewhat vertical manner.

11. The collapsible velocipede of claim 10 wherein said crossbars consist of shafts connected by flexible means.

12. The collapsible velocipede of claim 11 wherein said flexible means are springs.

13. The collapsible bicycle of claim 1, wherein said center unit does not contain said first bar (i) and said front unit does not contain lower attachment bar (e)